Feb. 23, 1965 R. F. JOHNSTONE 3,170,670
TWO-WAY PULP STOCK VALVE
Filed Feb. 19, 1962 4 Sheets-Sheet 2

INVENTOR
R. F. JOHNSTONE
Fetherstonhaugh & Co.
ATTORNEYS

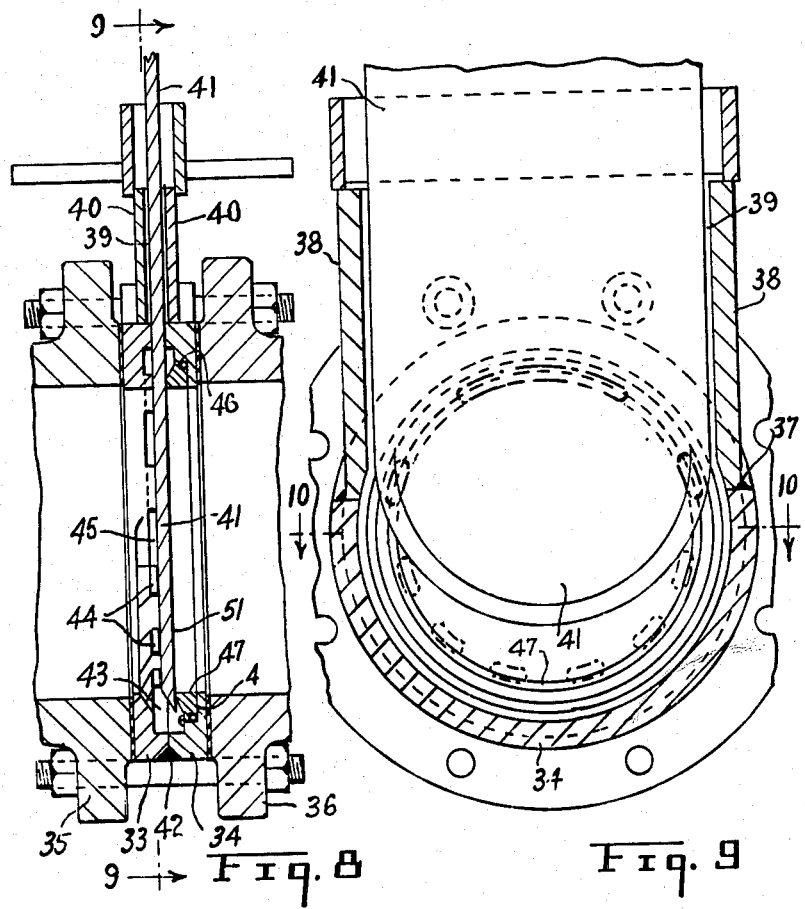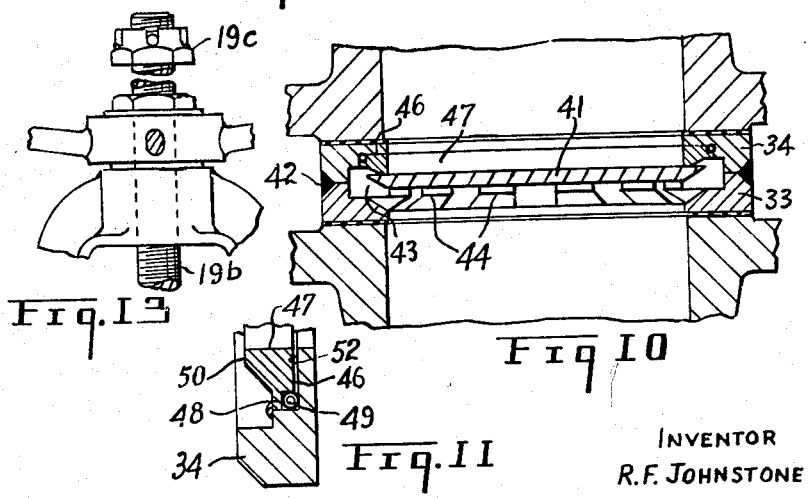

United States Patent Office 3,170,670
Patented Feb. 23, 1965

3,170,670
TWO-WAY PULP STOCK VALVE
Robert Fulton Johnstone, Champlain Heights, St. John, New Brunswick, Canada, assignor, by mesne assignments, to Crane Canada Limited, Montreal, Quebec, Canada
Filed Feb. 19, 1962, Ser. No. 174,152
Claims priority, application Canada, Oct. 27, 1961, 834,733
2 Claims. (Cl. 251—172)

This invention relates to gate valves and particularly to gate valves suitable for controlling the flow of pulp stock and pulp mill process fluids, and constructed in such a manner that a pressure tight seal is provided wtih pressure applied against either side of the valve gate.

The invention consists essentially in the provision of a floating valve seat and an O-ring seal accommodated in an annular recess in the body of the valve. The location of the O-ring with respect to the valve seat is such that the O-ring, in addition to providing a seal for the valve, exerts a pressure on the valve seat to maintain the valve seat always in full contact with the surface of the valve gate when the gate is closed, regardless of which direction the flow of stock passes through the valve. When the flow of stock through the valve is in one direction, the gate and the valve seat exert a pressure against the O-ring to increase the effectiveness of the O-ring seal, and when the flow of stock is in the opposite direction, the O-ring and the fluid exert a pressure on the valve seat to hold it firmly against the surface of the valve gate. The invention is further characterized in that when there is a flow through the valve in any direction, the O-ring holds the valve seat firmly against the surface of the valve gate and so prevents stock from getting between the gate and its seat and thereby preventing leakage past the gate.

The invention is further characterized in that the floating valve seat can be readily withdrawn from the valve body for repair or replacement by first removing the valve gate, and withdrawing the seat through the valve stuffing box. Means are provided to retain the valve seat in its annular recess when the valve gate is in the open position.

An object of the invention is to provide a floating valve seat and an O-ring combination which will provide an effective pressure tight seal when pressure is applied on either side of the valve gate.

A further object of the invention is to provide a floating valve seat which can be readily withdrawn through the valve stuffing box for either repair or replacement.

A further object of the invention is to provide means for holding the valve seat against the surface of the valve gate at all times when the gate is closed or partly closed.

A further object of the invention is to provide a pressure tight seat in the valve without the application of a wedging action on the valve gate.

A further object of the invention is to provide means to retain the valve seat in position in an annular recess against the pressure of the O-ring when the valve gate is open.

A further object of the invention is to provide a valve gate having pulp cutting means which are effective over the whole area of the valve seat.

These and other objects of the invention will be apparent from the following detailed description and from the accompanying drawings, in which:

FIG. 4 is an enlarged partial section showing the details of valve seat receiving recess in the body of the valve.

FIG. 5 is an enlarged partial section of the lowermost portion of the valve seal as seen in FIG. 1 and showing the position of the floating valve seat and O-ring under conditions of no pressure on the valve gate.

FIG. 6 is a view similar to FIG. 5 but showing the position of the floating valve seat and O-ring when pressure is applied to the valve gate in the direction of the arrow.

FIG. 7 is a view similar to FIG. 6 but showing the position of the floating valve seat and O-ring when pressure is applied to the valve gate in the opposite direction, as indicated by the arrow.

FIG. 8 is a longitudinal vertical section showing the invention applied to a wafer type valve.

FIG. 9 is a transverse vertical section of the valve shown in FIG. 8, taken on the line 9—9 of FIG. 8.

FIG. 10 is a sectional plan view taken on the line 10—10 of FIG. 9.

FIG. 11 is an enlarged vertical section of a portion of one half of the wafer type valve shown in FIG. 8 showing the floating valve seat located in the valve seat receiving recess.

FIG. 13 is a partial elevation of the upper part of the valve stem showing the means to limit the downward closnig movement of the valve gate to prevent a wedging action of the gate against the stops.

Figure 1:
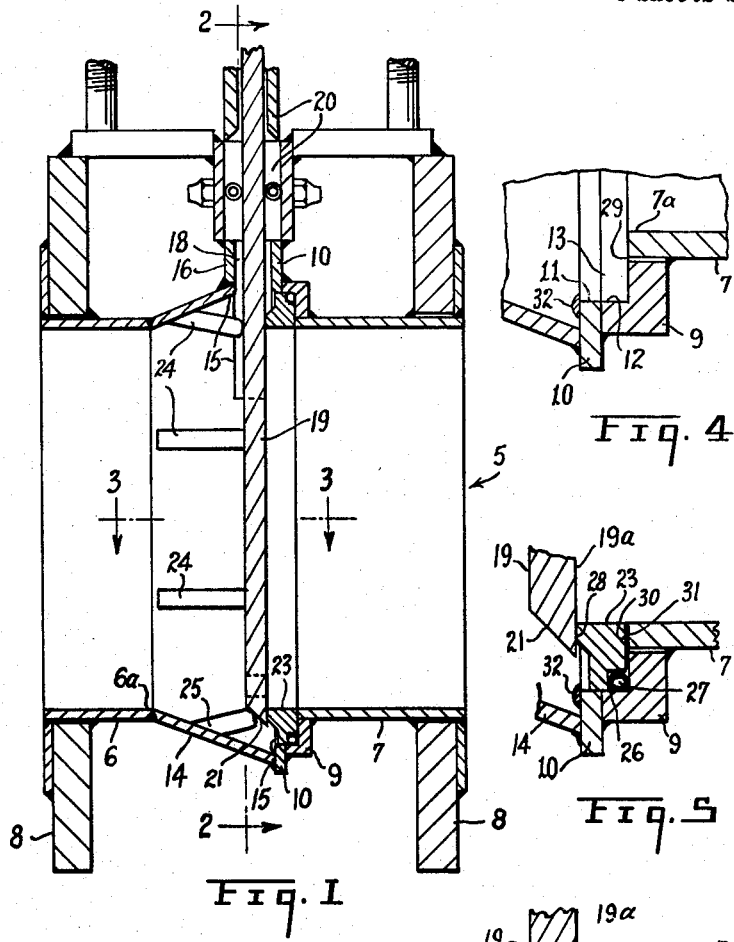
FIG. 1 is a longitudinal vertical section of a gate valve body showing the valve gate in the closed position and in sealing contact with the floating valve seat.

Referring to the drawings and particularly to FIGS. 1 to 7, the valve body 5 consists of a pair of tubular sections 6 and 7 axially aligned with each other and each having a flange 8 welded thereto at their opposite outer ends. Secured to the outer surface of the tubular section 7, at its inner end, is an annular ring 9 of angle section. A rectangular plate 10 having a circular opening 11 whose periphery is aligned axially with the inner peripheral surface 12 of the ring 9 to form a valve seat receiving recess 13, as seen in detail in FIG. 4.

Secured to the inner end 6a of the tubular section 6 is a generally outwardly tapering rectangular section 14 whose outwardly extended edges 15 are welded to the adjacent face of the rectangular plate 10 and to the upper filler section 16. The corners of the section 14 are preferably rounded at 17 to reduce the size of the pockets formed at the face of the rectangular plate 10 and at the same time provide ample clearance for the lower corners of the valve gate as will be described later.

The upper portion of the plate 10 and the filler section 16 are spaced apart to form a rectangular opening 18 through which the valve gate 19 is passed. The upper horizontal edges of the plate 10 and the filler section 16 together support the valve stuffing box assembly 20.

The gate valve is provided with the usual well known means for raising and lowering the valve gate 19 and with means to limit the travel of the gate in raising and lowering.

Figure 2:
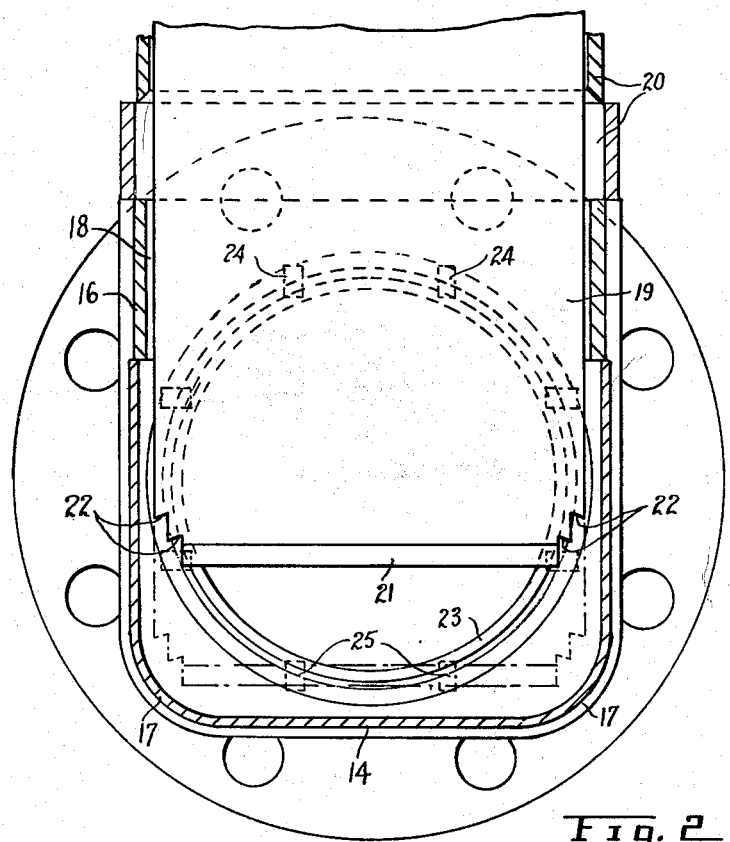
FIG. 2 is a transverse vertical section of the gate valve body taken on the line 2—2 of FIG. 1 and showing the valve gate partially open.
Figure 3:
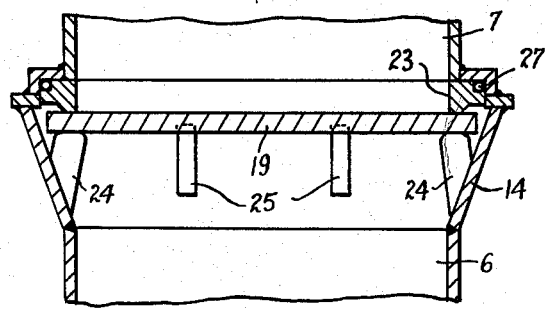
FIG. 3 is a sectional plan view of the valve taken on the line 3—3 of FIG. 1.

The valve gate 19 is generally rcetangular in shape and has its lower horizontal edge tapered at 21 to provide a pulp cutting edge. In addition, the lower portions of the vertical edges of the gate are provided with a series of notches 22 forming pulp cutting edges, as seen in FIG. 2. The valve gate is secured to the gate operating spindle 19b and a stop nut 19c on the top of the spindle 19a can be adjusted to limit the downward movement of the gate and prevent any wedging action of the gate with the stops 24.

The valve gate 19 is kept in its vertically aligned position on one side by the floating valve seat 23 and on the other side by a series of stops 24 welded to the inner surface of the section 14, while the lower stops 25 contact the tapered surface 21 of the valve gate 19 when stock flow is in the direction of the arrow as seen in FIG. 7, as will be explained later.

The annular floating valve seat 23 is seated in the recess 13 in the body of the valve and has an annular recess 26 on its outer peripheral surface to accommodate the O-ring 27. A valve gate seating surface 28 coplanar with the adjacent surface 19a of the valve gate 19 is projected axially from the body of the valve seat 23 towards the valve gate 19.

The axial length of the valve seat 23 with respect to the axial length between the adjacent surface 19a of the valve gate and the rear vertical wall 29 of the recess 12 is such that the valve seat is permitted axial movement in its seat, in the order of approximately 0.010 inch.

Under conditions in which there is no flow of fluid through the valve the O-ring 27 exerts an axial pressure on the valve seat 23 and forcing its seating surface 28 into metal to metal contact with the adjacent surface 19a of the valve gate and separating the rear face 30 of the valve seat from the adjacent face 29 of the seating recess 13. The clearance 31 thus provided behind the valve seat is of the order of approximately 0.010 inch and is maintained by the axial load transmitted by the O-ring 27. This condition is illustrated in FIG. 5.

When the flow of stock through the valve is in the direction of the arrow A, see FIG. 6, and the valve gate 19 is in the closed or partly closed position, the flow will exert a pressure upon the gate in the direction of the arrow and in opposition to the axial pressure exerted by the O-ring 27. The pressure on the gate 19 will be sufficient to move the valve seat 23 axially to close up the clearance gap 31 and to compress the O-ring. The metal to metal contact between the surface 19a of the valve gate and the valve seat is maintained and the increased pressure of the O-ring between the valve seat and the body of the valve prevents any leakage past the valve gate. Under these conditions there will be a slight gap between the tapered surface 21 of the valve gate and the adjacent lower stops 25.

When the flow through the valve is in the opposite direction, in the direction of the arrow B as shown in FIG. 7, the pressure against the valve gate 19 will be in the same direction as that exerted axially by the O-ring 27 so that the valve gate will be moved a fractional amount into contact with the lower stops 25. The valve seat, by reason of the pressure of the O-ring will follow the valve gate and maintain metal to metal contact therewith, while the O-ring maintains a positive seal between the valve seat and the body of the valve. As the clearance gap 31 is again opened up, the fluid under pressure will be applied against the rear surface 30 of the valve seat 23 thereby increasing the metal to metal contact between the valve seat and the valve gate, with the O-ring 27 maintaining a pressure tight seal between the valve seat and the body of the valve at all times regardless of the direction of flow through the valve.

When the valve gate 19 is in the open position, the upper portion of the valve seat 23 is retained within its annular recess 13 by the lowermost edge of the gate itself while the stop 32 on the lower portion of the inner periphery of the opening 11 in the plate 10 retains the lower portion of the valve seat in its recess.

In order to remove the valve seat 23 for repair, such as regrinding, or for replacement, it is only necessary to remove the valve gate 19 from the body of the valve together with the stuffing box assembly 20. It is then a simple matter to move the valve seat into the plane of the opening 18 and lift the valve seat out through that opening.

In FIGS. 8 to 11 the invention is shown applied to a wafer type valve in which the body of the wafer valve is formed of two wafer members 33 and 34, sandwiched between the flanged pipe members 35 and 36. The two wafer members 33 and 34 are here shown as being slotted at 37 to receive the side plates 38 and to form a rectangular opening 39 with the plates 40 to permit movement of the gate 41 into and out of its closed position in the valve.

The two wafer members 33 and 34 are shown welded together at 42, but could be secured together in any other suitable manner or could be cast in one piece.

The wafer valve body is provided with an annular recess 43 in the plane of the valve gate 41 and a series of stops 44 are projected into the recess 43 towards the adjacent surface 45 of the valve gate 41. The wafer valve body is also provided with a second annular recess 46 wholly in the member 34 and of smaller diameter than the recess 43. The annular floating valve seat 47 is seated in the recess 46 and is in turn provided with an annular recess 48 in which is seated the O-ring 49, in the same manner as the valve seat 23 above described. A valve gate sealing surface 50 coplanar with the adjacent surface 51 of the valve gate 41 is projected axially from the body of the valve seat 47 towards the valve gate 41.

The axial length of the valve seat 47 with respect to the axial length between the adjacent surfaces 51 of the valve gate and the rear wall 52 of the recess 46 is such that the valve seat is permitted axial movement in its seat, in the order of approximately 0.010 inch.

The operation of this modified form of gate valve is the same as above described in connection with the form shown in FIGS. 1 and 2 and as shown in detail in FIGS. 5, 6 and 7. The O-ring 49 maintains the valve seat 47 in contact with the adjacent surface 51 of the valve gate 41 at all times and under all operating conditions such as reversal of flow through the valve. Also the valve seat 47 can be withdrawn through the valve stuffing box, after the valve gate 41 has been withdrawn, thus permitting the valve seat to be repaired or replaced without the necessity of taking the whole valve out of the line.

Figure 12:
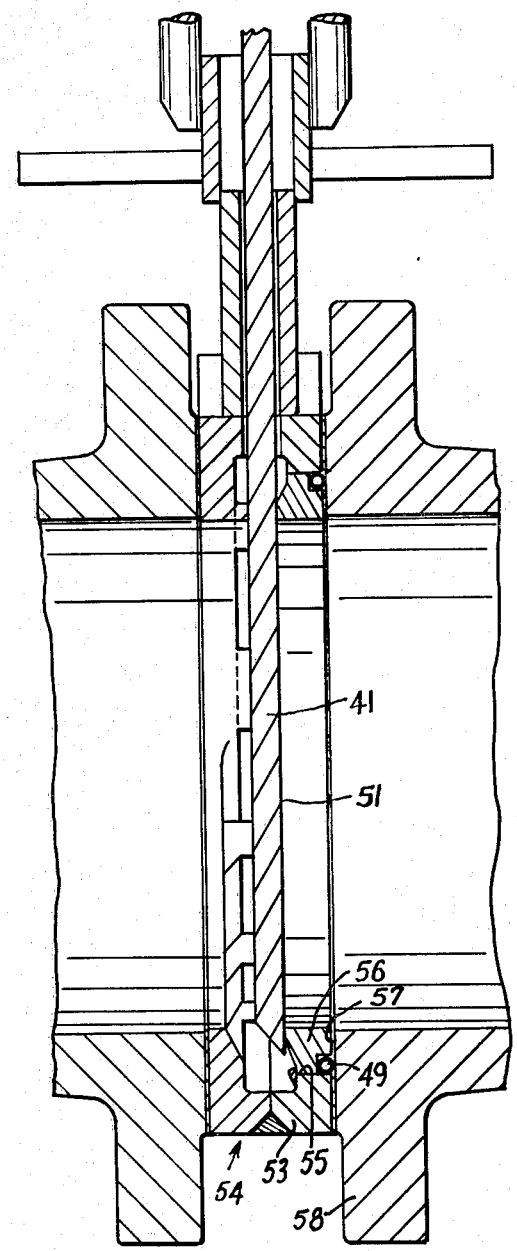
FIG. 12 is an enlarged view similar to FIG. 8 showing a modified form of floating valve seat.

In FIG. 12 there is illustrated a modification of the floating valve seat arrangement shown in FIG. 8. In this modification, the member 53 of the wafer valve 54 is provided with an annular bore 55 coaxial with the axis of the passage through the valve, instead of the annular recess 46 shown in FIG. 8. This annular bore 55 permits the annular floating valve seat 56 to be inserted into place in the annular bore and against the adjacent surface 51 of the valve gate 41 before the wafer valve is connected into the pipeline. In this particular application, the adjacent face 57 of the pipe flange 58 acts as the rear stop for the floating valve seat 56 and, together with the peripheral surface of the annular bore forms a sealing recess for the valve seat when the wafer valve is connected on the pipeline. The sealing of the valve and the action of the O-ring 49 is the same as that described above in connection with FIGS. 5, 6 and 7.

By using a valve constructed in any of the forms above described, it is possible to permit the flow of fluid in either direction through the valve using only a single valve seat. Under all operating conditions there is maintained a metal to metal seal between the valve gate and the valve seat on the one hand, while on the other hand, the O-ring maintaining a pressure tight seal between the valve seat and the body of the valve. The permissible axial movement of the valve seat allows for a degree of flexibility between it and the valve gate which is not possible with a rigidly located valve seat, while, at the same time the O-ring provides the necessary degree of pressure to ensure a positive seal under all operating conditions, and with flow of fluid being directed in either direction through the valve and against the face of the valve gate.

What I claim is:

1. A pulp stock valve for the control of the flow of fluid in either direction through the valve, the said gate valve comprising a housing having a fluid flow passage therethrough, a valve gate aligned transversely of the said passage and adapted to be moved into opening and closing positions relative to said passage, the said valve gate having its lower edge tapered and having its side edges notched to provide cutting edges, an annular recess in the walls of said passage located on one side of the plane of said gate valve, an annular floating metal valve seat in said annular recess, a stuffing box in said housing, the said stuffing box maintaining the said valve gate fluid pressure tight in said housing, the said valve seat being movable into the plane of the said stuffing box and is removable therethrough when the said valve gate has been removed from the said housing, and means to maintain the said valve seat in metal to metal sealing contact with the said valve gate when the said valve gate is in the closed position, the said means providing a pressure seal between the said valve seat and the said housing.

2. A pulp stock valve for the control of the flow of fluid in either direction through the valve, the said gate valve comprising a housing consisting of a pair of axially spaced apart tubular sections and an intermediate section, an annular member joining one of said tubular sections to the adjacent edge of said intermediate section and forming an annular recess of greater diameter than the said tubular sections, the said intermediate section of the housing being tapered in longitudinal section and having its enlarged end adjacent said annular member taking a rectangular shape in transverse section, a floating metal valve seat in said annular recess, a valve gate adapted to be moved into and out of said intermediate section adjacent said annular recess, the said gate valve having a rectangular shape and having its lower horizontal edge tapered and its side edges notched to form cutting edges in the plane of the adjacent face of said floating valve seat, and means to maintain the said valve seat in metal to metal sealing contact with the said valve gate when the said valve gate is in the closed position, the said means providing a pressure seal between the said valve seat and the said housing.

References Cited by the Examiner

UNITED STATES PATENTS

| | | | |
|---|---|---|---|
| Re. 24,401 | 12/57 | Williams | 251—329 XR |
| 594,662 | 11/97 | Speer | 251—361 |
| 1,226,380 | 5/17 | Riley | 251—329 XR |
| 1,815,349 | 7/31 | Doughty et al. | 251—264 |
| 2,064,567 | 12/36 | Riley | 251—170 XR |
| 2,732,170 | 1/56 | Shand | 251—172 |
| 2,819,035 | 1/58 | Graham | 251—170 |
| 2,825,527 | 3/58 | Wendell | 251—172 XR |
| 2,851,242 | 9/58 | Dunbar | 251—170 |
| 2,890,017 | 6/59 | Shafer | 29—157.1 XR |
| 2,977,975 | 4/61 | Allen | 251—361 XR |
| 3,000,608 | 9/61 | Williams | 251—170 |
| 3,006,599 | 10/61 | Eckert | 251—172 |

LAVERNE D. GEIGER, *Primary Examiner.*

ISADOR WEIL, *Examiner.*